(12) United States Patent
Murata et al.

(10) Patent No.: US 9,884,617 B2
(45) Date of Patent: Feb. 6, 2018

(54) CONTROL SYSTEM FOR HYBRID VEHICLE

(71) Applicant: TOYOTA JIDOSHA KABUSHIKI KAISHA, Toyota-shi (JP)

(72) Inventors: Sohei Murata, Chiryu (JP); Akiko Nishimine, Toyota (JP); Kensei Hata, Sunto-gun (JP); Yosuke Suzuki, Hadano (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 152 days.

(21) Appl. No.: 14/963,873

(22) Filed: Dec. 9, 2015

(65) Prior Publication Data
US 2016/0176392 A1   Jun. 23, 2016

(30) Foreign Application Priority Data
Dec. 18, 2014   (JP) .................................. 2014-255855

(51) Int. Cl.
*B60K 25/02* (2006.01)
*B60K 6/445* (2007.10)
(Continued)

(52) U.S. Cl.
CPC ............. *B60W 20/15* (2016.01); *B60K 6/445* (2013.01); *B60K 25/02* (2013.01); *B60W 10/30* (2013.01); *B60W 20/40* (2013.01); *B60W 50/06* (2013.01); *F16H 57/0441* (2013.01); *F16H 57/0486* (2013.01); *F16H 61/0031* (2013.01); *B60K 2006/381* (2013.01); *B60W 2510/0657* (2013.01); *B60W 2710/30* (2013.01); *F16H 3/727* (2013.01); *F16H 57/0446* (2013.01);
(Continued)

(58) Field of Classification Search
None
See application file for complete search history.

(56) References Cited

U.S. PATENT DOCUMENTS 5,788,006 A    8/1998  Yamaguchi
2007/0173373 A1*  7/2007  Kinugasa ................. B60K 6/36
                                                                                 477/3
(Continued)

FOREIGN PATENT DOCUMENTS

JP    8-295140        11/1996
JP    2006-153091 A    6/2006
(Continued)

*Primary Examiner* — Navid Ziaeianmehdizadeh
(74) *Attorney, Agent, or Firm* — Oblon, McClelland, Maier & Neustadt, L.L.P.

(57) ABSTRACT

A control system for a hybrid vehicle includes an electronic control unit. The electronic control unit is configured to, when any one of the following conditions iii) to vi) is satisfied, activate the oil pump to start supplying oil to a power split mechanism: iii) a required driving force becomes larger than or equal to a first pump changing value when a first drive mode is selected; iv) a vehicle speed becomes higher than or equal to a second pump changing value when the first drive mode is selected; v) the required driving force becomes smaller than or equal to a third pump changing value when the third drive mode is selected; and vi) the vehicle speed becomes lower than or equal to a fourth pump changing value when the third drive mode is selected.

13 Claims, 7 Drawing Sheets

(51) Int. Cl.
    *B60W 20/00*   (2016.01)
    *B60W 10/08*   (2006.01)
    *B60W 20/15*   (2016.01)
    *F16H 57/04*   (2010.01)
    *F16H 61/00*   (2006.01)
    *B60W 10/30*   (2006.01)
    *B60W 20/40*   (2016.01)
    *B60W 50/06*   (2006.01)
    *F16H 3/72*    (2006.01)
    *F16H 37/08*   (2006.01)
    *B60K 6/38*    (2007.10)

(52) U.S. Cl.
    CPC ............... *F16H 2037/0866* (2013.01); *F16H 2061/0037* (2013.01); *Y02T 10/6239* (2013.01); *Y10S 903/902* (2013.01)

(56) References Cited

U.S. PATENT DOCUMENTS

| | | | | |
|---|---|---|---|---|
| 2008/0234915 A1* | 9/2008 | Nomasa | ................ | B60K 6/365 701/102 |
| 2009/0082151 A1* | 3/2009 | Tabata | ................ | B60K 6/26 475/5 |
| 2009/0098969 A1* | 4/2009 | Tabata | ................ | B60K 6/387 475/5 |
| 2009/0236159 A1* | 9/2009 | Shibata | ................ | B60W 10/30 180/65.235 |
| 2011/0230292 A1 | 9/2011 | Komatsu et al. | | |
| 2011/0298314 A1* | 12/2011 | Atarashi | ................ | B60K 6/405 310/54 |
| 2014/0358349 A1* | 12/2014 | Okuda | ................ | B60K 6/445 701/22 |
| 2015/0006007 A1* | 1/2015 | Kitahata | ................ | B60K 6/442 701/22 |
| 2015/0046009 A1* | 2/2015 | Maruyama | ............ | B60K 6/445 701/22 |
| 2015/0246671 A1 | 9/2015 | Imamura et al. | | |
| 2016/0069428 A1* | 3/2016 | Takayanagi | ............ | B60K 6/383 60/420 |
| 2016/0101771 A1* | 4/2016 | Hata | ................ | B60K 6/445 701/22 |
| 2016/0101773 A1* | 4/2016 | Hata | ................ | B60W 20/10 701/22 |
| 2016/0101776 A1* | 4/2016 | Hata | ................ | B60W 20/40 477/3 |
| 2016/0137050 A1* | 5/2016 | Nishimine | ............ | B60K 6/445 475/2 |
| 2016/0146332 A1* | 5/2016 | Taniguchi | ........... | F16H 57/0479 475/5 |
| 2016/0159212 A1* | 6/2016 | Omuro | ................ | B60K 6/387 475/5 |
| 2016/0159341 A1* | 6/2016 | Tabata | ................ | B60K 6/442 701/22 |
| 2016/0193938 A1* | 7/2016 | Hata | ................ | B60K 6/387 701/22 |
| 2016/0207519 A1* | 7/2016 | Hata | ................ | B60W 20/10 |
| 2016/0230850 A1* | 8/2016 | Kanada | ................ | B60K 6/387 |
| 2016/0250917 A1* | 9/2016 | Shibata | ................ | B60K 6/365 475/5 |

FOREIGN PATENT DOCUMENTS

| | | |
|---|---|---|
| JP | 2014-848 | 1/2014 |
| JP | 2014-108752 A | 6/2014 |
| WO | WO 2011/114785 A1 | 9/2011 |

\* cited by examiner

CONTROL SYSTEM FOR HYBRID VEHICLE

INCORPORATION BY REFERENCE

The disclosure of Japanese Patent Application No. 2014-255855 filed on Dec. 18, 2014 including the specification, drawings and abstract is incorporated herein by reference in its entirety.

BACKGROUND OF THE INVENTION

1. Field of the Invention

The invention relates to a control system for a hybrid vehicle including an engine and at least two motors or motor generators as driving force sources.

2. Description of Related Art

Japanese Patent Application Publication No. 8-295140 (JP 8-295140 A) and Japanese Patent Application Publication No. 2014-848 (JP 2014-848 A) describe a hybrid vehicle including an engine and two motor generators as driving force sources. In the hybrid vehicle, the engine and the first motor generator are respectively coupled to two rotating elements of a power split mechanism formed of a single-pinion-type planetary gear mechanism, and the second motor generator is coupled to a gear train coupled to drive wheels and an output element of the power split mechanism. The thus configured hybrid vehicle is allowed to select one of a hybrid mode and a one-motor mode. In the hybrid mode, the hybrid vehicle travels by transmitting the output torque of the engine to the drive wheels as a result of outputting reaction torque from the first motor generator. In the one-motor mode, the hybrid vehicle travels by transmitting the output torque of the second motor generator to the drive wheels in a state where the engine is stopped.

In addition, the hybrid vehicle described in JP 8-295140 A is configured to be able to transmit the output torque of the first motor generator to the drive wheels. Specifically, fixing means, such as a one-way clutch and a brake, for stopping an output shaft of the engine is provided. By stopping the output shaft of the engine with the use of the fixing means in this way, it is possible to transmit the output torque of the first motor generator to the drive wheels. Therefore, even when a required driving force is relatively high, the hybrid vehicle is able to travel by transmitting the output torque of both the first motor generator and the second motor generator to the drive wheels without driving the engine, so it is possible to suppress deterioration of fuel economy.

The hybrid vehicle described in JP 2014-848 A includes a mechanical oil pump that rotates integrally with the engine and an electric oil pump that is driven by energization and that has a smaller capacity than the mechanical oil pump. The hybrid vehicle is configured to, even when a drive mode that is determined on the basis of a required driving force and a vehicle speed is the one-motor mode but when the viscosity of oil is high, change the drive mode to the hybrid mode. This is because a load on the electric oil pump increases as the viscosity of oil becomes higher and there is a possibility that the durability of the electric oil pump decreases.

The oil pumps described in JP 2014-848 A may be mounted on the hybrid vehicle described in JP 8-295140 A. Because a torque that acts on a differential mechanism at the time when the two-motor mode in which a driving torque is output from each of the motor generators is selected is larger than a torque that acts on the differential mechanism at the time when the one-motor mode is selected, oil is supplied from the electric oil pump to the differential mechanism when the two-motor mode is selected. On the other hand, there is an inevitable delay from when driving of the electric oil pumps is started to when oil reaches the differential mechanism. Therefore, when driving of the electric oil pump is started simultaneously with switching of the drive mode to the two-motor mode, the differential mechanism transmits torque in a non-lubricated state or non-cooled state until oil reaches the differential mechanism, so there is a possibility of a decrease in durability. Alternatively, when the vehicle is caused to travel while another drive mode is set in order to suppress a decrease in the durability of the differential mechanism in this way, there is a possibility that a period during which the hybrid vehicle is allowed to be caused to travel in the two-motor mode shortens or an opportunity to cause the hybrid vehicle to travel in the two-motor mode reduces.

SUMMARY OF THE INVENTION

The invention provides a control system for a hybrid vehicle, which is able to extend a period during which the hybrid vehicle travels in a two-motor drive mode or increase an opportunity to cause the hybrid vehicle to travel in the two-motor drive mode.

A control system related to the present invention is for a hybrid vehicle. The vehicle including an engine, an output member, a power split mechanism, a brake mechanism, a first motor, a second motor, a first oil pump and a second oil pump, the power split mechanism including a first rotating element, a second rotating element and a third rotating element. The power split mechanism is configured to carry out differential action. An output torque of the engine is transmitted to the first rotating element. The first motor has a power generation function coupled to the second rotating element. The output member is coupled to the third rotating element. The brake mechanism is configured to selectively stop rotation of the first rotating element. The second motor is configured to add a driving torque for propelling the vehicle to a torque of the output member. The first oil pump is coupled to the first rotating element. The first oil pump is configured to be driven by the output torque of the engine to supply oil to the power split mechanism. The second oil pump is configured to be driven through energization to supply oil to the power split mechanism. The control system includes an electronic control unit. The electronic control unit is configured to select a second drive mode when any one of the following conditions i), ii) is satisfied: i) a required driving force is larger than the required driving force at which a first drive mode is selected or a vehicle speed is larger than the vehicle speed at which the first drive mode is selected; and ii) the required driving force is lower than the required driving force at which a third drive mode is selected or the vehicle speed is lower than the vehicle speed at which the third drive mode is selected. The electronic control unit is configured to, when any one of the following conditions iii) to vi) is satisfied, activate the second oil pump to start supplying oil from the second oil pump to the power split mechanism: iii) the required driving force becomes larger than or equal to a first pump changing value when the first drive mode is selected, the first pump changing value being smaller than a first drive changing value at which a drive mode is changed from the first drive mode to the second drive mode; iv) the vehicle speed becomes higher than or equal to a second pump changing value when the first drive mode is selected, the second pump changing value being lower than a second drive changing value at which the drive mode is changed from the first drive mode to the second drive mode; v) the required driving force becomes smaller than or equal to a third pump changing value when the third drive mode is selected, the third pump changing value being larger than a third drive changing value at which the drive mode is changed from the third drive mode to the second drive mode; and vi) the vehicle speed becomes lower than or equal to a fourth pump changing value when the third drive mode is selected, the fourth pump changing value being higher than a fourth drive changing value at which the drive mode is changed from the third drive mode to the second drive mode. The first drive mode is a mode in which fixing of the first rotating element by the brake mechanism is released and the vehicle travels by using the driving torque of the second motor. The second drive mode is a mode in which a torque output from the first motor is transmitted to the output member via the power split mechanism in a state where the first rotating element is fixed by the brake mechanism and the vehicle travels by using the driving torque output from the second motor. The third drive mode is a mode in which the vehicle travels by using the output torque of the engine or the output torque of both the engine and the second motor in a state where fixing of the first rotating element by the brake mechanism is released.

With the above control system, it is possible to start supplying oil to the power split mechanism before the drive mode is changed to the second drive mode in which the vehicle is driven in a state where the first oil pump that is driven by the output torque of the engine is stopped. Therefore, it is possible to suppress insufficient lubrication and insufficient cooling in the second drive mode. As a result, it is possible to extend a period during which the vehicle travels in the second drive mode or increase an opportunity for the vehicle to travel in the second drive mode.

The electronic control unit may be configured to execute the following vii) or viii): vii) a first deviation or a second deviation is respectively set such that a time from when the second oil pump is activated to when oil begins to be supplied to the power split mechanism is shorter than a first time or a second time, the first deviation is a deviation between the first drive changing value and the first pump changing value, the second deviation is a deviation between the second drive changing value and the second pump changing value, the first time is a time that is required for the required driving force to change from the first pump changing value to the first drive changing value in the first drive mode, the second time is a time that is required for the vehicle speed to change from the second pump changing value to the second drive changing value; viii) a third deviation or a fourth deviation is respectively set such that a time from when the second oil pump is activated to when oil begins to be supplied to the power split mechanism is shorter than a third time or a fourth time, the third deviation is a deviation between the third drive changing value and the third pump changing value, the fourth deviation is a deviation between the fourth drive changing value and the fourth pump changing value, the third time is a time that is required for the required driving force to change from the third pump changing value to the third drive changing value in the third drive mode, the fourth time is a time that is required for the vehicle speed to change from the fourth pump changing value to the fourth drive changing value.

The electronic control unit is configured to detect any one of a temperature of the oil, an ambient temperature and a temperature of the second oil pump. The electronic control unit may be configured to set at least any one of the first deviation, second deviation, third deviation and fourth deviation such that the at least any one of the first deviation, second deviation, third deviation and fourth deviation increases as detected temperature detected by the electronic control unit decreases.

The electronic control unit may be configured to detect an elapsed time or travel distance from when the second oil pump is stopped. The electronic control unit may be configured to set at least any one of the first deviation, second deviation, third deviation and fourth deviation such that the at least any one of the first deviation, second deviation, third deviation and fourth deviation increases as detected elapsed time or travel distance detected by the electronic control unit extends.

The electronic control unit may be configured to detect a vehicle stop time. The electronic control unit may be configured to set at least any one of the first deviation, second deviation, third deviation and fourth deviation such that the at least any one of the first deviation, second deviation, third deviation and fourth deviation increases as detected vehicle stop time detected by the electronic control unit gets longer.

The electronic control unit is configured to estimate an amount of change in the required driving force toward the first drive changing value in a state where the first drive mode is selected or an amount of change in the required driving force toward the third drive changing value in a state where the third drive mode is selected. The electronic control unit may be configured to set at least any one of the first deviation, second deviation, third deviation and fourth deviation such that the at least any one of the first deviation, second deviation, third deviation and fourth deviation increases as estimated amount of change in the required driving force estimated by the electronic control unit increases.

The electronic control unit may be configured to detect a gradient of a traveling road surface. The electronic control unit may be configured to set at least any one of the first deviation, second deviation, third deviation and fourth deviation such that the at least any one of the first deviation, second deviation, third deviation and fourth deviation increases as detected gradient of the traveling road surface detected by the electronic control unit increases.

The electronic control unit may be configured to detect a rate of change in accelerator position. The electronic control unit may be configured to set at least any one of the first deviation, second deviation, third deviation and fourth deviation such that the at least any one of the first deviation, second deviation, third deviation and fourth deviation increases as detected rate of change in accelerator position detected by the electronic control unit increases.

The electronic control unit may be configured to set at least any one of the first pump changing value, the second pump changing value, the third pump changing value and the fourth pump changing value at the time of a startup of the vehicle.

The electronic control unit may be configured to continue driving the second oil pump until a predetermined period elapsed from when the drive mode is changed from the second drive mode to the first drive mode.

The electronic control unit may be configured to extend the predetermined period as an output torque of the first motor and a rotation speed of the first motor increase at the time when the vehicle is traveling in the second drive mode.

The electronic control unit may be configured to estimate a temperature of the power split mechanism, and the electronic control unit may be configured to cause the second oil pump to be driven until estimated temperature estimated by the electronic control unit becomes lower than or equal to a predetermined temperature.

The electronic control unit may be configured to continue driving the second oil pump until an output torque of the first motor and a rotation speed of the first motor become smaller than or equal to corresponding predetermined values, in transition of a change from the second drive mode to the first drive mode.

With the above control system, even after the drive mode is changed from the second drive mode to the first drive mode, it is possible to continue driving the second oil pump. Therefore, it is possible to cool the power split mechanism at the time when vehicle is traveling in the first drive mode, so it is possible to decrease the temperature of the power split mechanism at the time when the vehicle starts traveling in the second drive mode again. As a result, it is possible to extend a period during which the vehicle travels in the second drive mode or increase an opportunity for the vehicle to travel in the second drive mode.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 9:
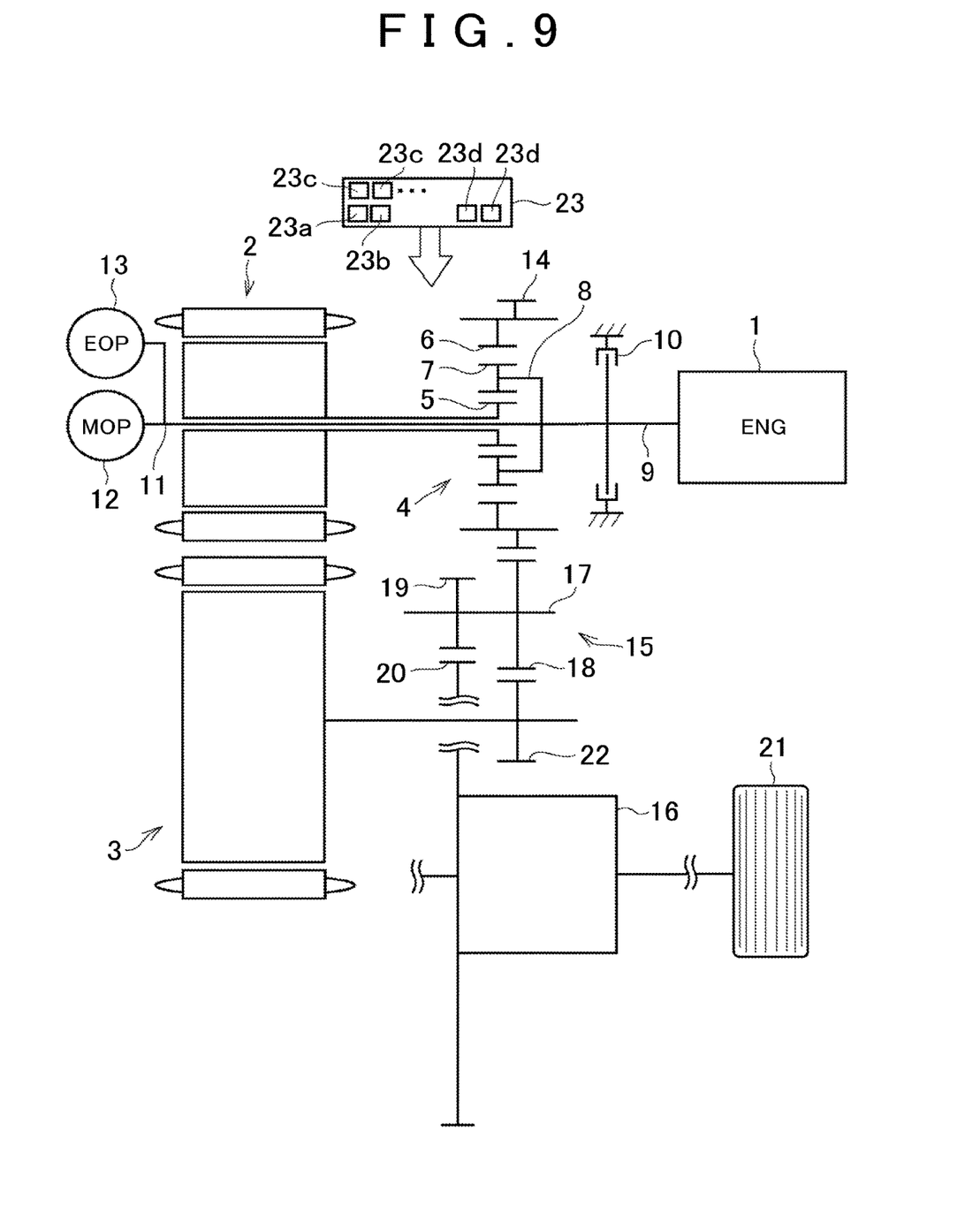
FIG. 9 is a skeletal view that shows an example of a drive line in a hybrid vehicle to which the invention is applicable.

An example of a hybrid vehicle to which the invention is applicable is shown by a skeletal view in FIG. 9. A hybrid drive system is a so-called two-motor-type drive system, and includes an engine (ENG) 1 and two motors 2, 3 as driving force sources. The engine 1 is an internal combustion engine, such as a gasoline engine and a diesel engine. The first motor 2 may be a motor generator (MG) that is able to regenerate energy or output power. The second motor 3 may be similarly a motor generator (MG). The hybrid drive system includes a power split mechanism 4 that distributes power, output from the engine 1, to the first motor 2 and an output member. The power split mechanism 4 may be formed of a differential mechanism, such as a planetary gear mechanism, and is formed of a single-pinion-type planetary gear mechanism in the example shown in FIG. 9.

A plurality of (for example, three) pinion gears 7 that are in mesh with a sun gear 5 and a ring gear 6 are arranged between these sun gear 5 and ring gear 6. Those pinion gears 7 are supported by a carrier 8 so as to be rotatable and revolvable. A structure of supporting the pinion gears 7 by the carrier 8 is similar to a structure in a generally known planetary gear mechanism. The structure will be simply described. Pinion pins are supported by the carrier 8, and each of the pinion gears 7 is rotatably fitted to the outer peripheral side of a corresponding one of the pinion pins via a bearing, such as a needle bearing. Each of the pinion pins has an oil hole along its central axis. Another oil hole extends from each oil hole to the outer periphery. Lubricating oil is supplied to the bearings, tooth flanks, and the like, via these oil holes.

The carrier 8 is a so-called input element. Power from the engine 1 is transmitted to the carrier 8. That is, an output shaft (crankshaft) 9 of the engine 1 and the carrier 8 are coupled to each other. The carrier 8 is an example of a first rotating element when the invention is implemented. A brake mechanism 10 is provided between the carrier 8 and the engine 1. The brake mechanism 10 selectively stops rotation of the carrier 8. The brake mechanism 10 may be any one of a friction brake, a dog brake and a one-way clutch.

The first motor 2 is arranged along the same axis as the power split mechanism 4 across the power split mechanism 4 from the engine 1. The first motor 2 is coupled to the sun gear 5. Therefore, the sun gear 5 is a so-called reaction element, and the sun gear 5 is an example of a second rotating element when the invention is implemented. A rotor shaft of the first motor 2 and a sun gear shaft to which the rotor shaft is coupled are hollow shafts. A pump shaft 11 is inserted inside the hollow shafts. One end of the pump shaft 11 is coupled to the engine 1. A mechanical oil pump (hereinafter, referred to as MOP) 12 is coupled to the other end of the pump shaft 11. The MOP 12 is an example of a first oil pump when the invention is implemented. The MOP 12 is driven by the engine 1 to generate hydraulic pressure for control, hydraulic pressure for lubrication and hydraulic pressure for cooling. In order to ensure hydraulic pressure at the time when the engine 1 is stopped, an electric oil pump (hereinafter, referred to as EOP) 13 is provided in parallel with the MOP 12. The electric oil pump 13 is driven by energization. The EOP 13 is an example of a second oil pump when the invention is implemented, and is smaller in capacity than the MOP 12.

The ring gear 6 in the planetary gear mechanism that constitutes the power split mechanism 4 is a so-called output element. An output gear 14 is integrally provided with the ring gear 6. The output gear 14 is an external gear. The ring gear 6 is an example of a third rotating element when the invention is implemented. The output gear 14 is an example of an output member when the invention is implemented. The output gear 14 is coupled to a differential gear 16 via a counter gear unit 15. That is, a driven gear 18 connected to a counter shaft 17 is in mesh with the output gear 14. A drive gear 19 having a smaller diameter than the driven gear 18 is connected to the counter shaft 17. The drive gear 19 is in mesh with a ring gear 20 in the differential gear 16. A driving force is output from the differential gear 16 to right and left drive wheels 21. Another drive gear 22 is in mesh with the driven gear 18. The second motor 3 is coupled to the drive gear 22. That is, torque of the second motor 3 is added to torque that is output from the output gear 14.

The first motor 2 and the second motor 3 are electrically connected to each other via an electrical storage device (not shown) or an inverter (not shown), and are configured to be able to supply electric power generated by the first motor 2 to the second motor 3.

The above-described hybrid vehicle is able to selectively set one of three drive modes, that is, a hybrid mode (HV mode), a two-motor mode and a one-motor mode. The HV mode is a drive mode in which power output from the engine 1 is distributed by the power split mechanism 4 to the first motor 2 side and the output gear 14 side, electric power generated by the first motor 2 functioning as a power generator is supplied to the second motor 3, and the output torque of the second motor 3 is added to the torque of the output gear 14 in the counter gear unit 15. That is, the HV mode is a mode in which the hybrid vehicle travels by substantially transmitting power (torque), output from the engine 1, to the drive wheels. In the HV mode, the second motor 3 may output torque by supplying the second motor 3 with electric power output from the electrical storage device (not shown) in addition to electric power generated by the first motor 2. That is, power (torque) output from the engine 1 and power (torque) output from the second motor 3 may be transmitted to the drive wheels. A state where the hybrid vehicle is traveling in the HV mode is an example of a third drive mode when the invention is implemented.

The two-motor mode is a mode in which the first motor 2 and the second motor 3 are operated as driving force sources for propelling the hybrid vehicle, and the hybrid vehicle travels by the use of the power of these two motors 2, 3. In this case, in order to transmit the output torque of the first motor 2 to the drive wheels 21, the carrier 8 is fixed by the brake mechanism 10. A state where the hybrid vehicle is traveling in the two-motor mode is an example of a second drive mode when the invention is implemented. The one-motor mode is a mode in which the hybrid vehicle travels by using the second motor 3 as a driving force source. When the one-motor mode is selected, control over the output torque of the engine 1 and first motor 2 is stopped. In this case, rotation of the engine 1 stops, and the first motor 2 is co-rotated. In the one-motor mode, fixing of the output shaft of the engine 1 by the brake mechanism 10 is released, and this drive mode is an example of a first drive mode when the invention is implemented.

Figure 2:
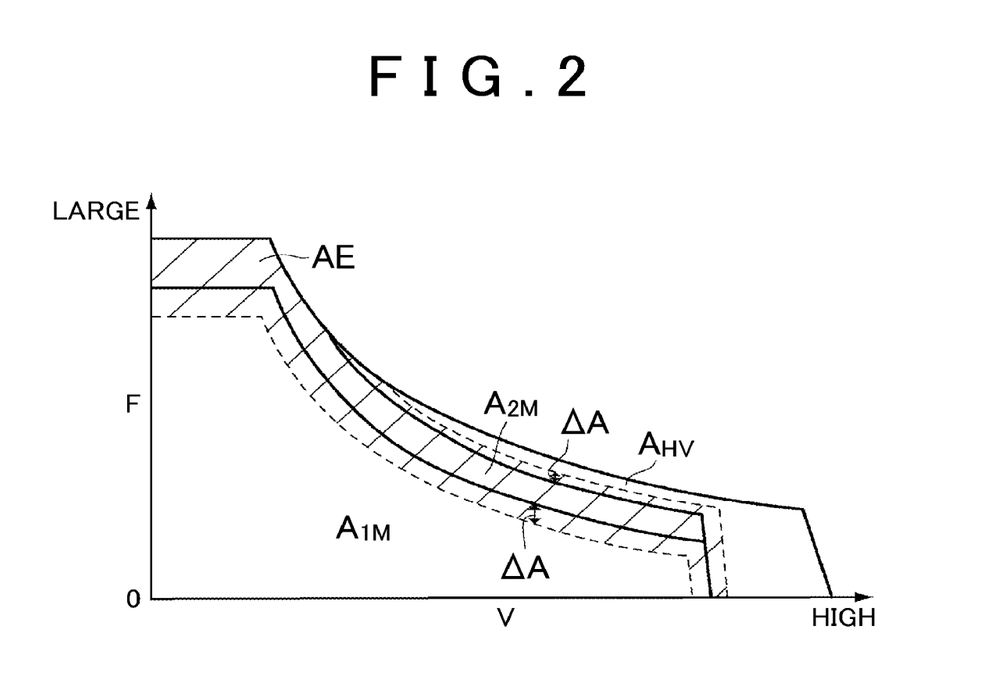
FIG. 2 is a graph that shows an example of an EOP driving region and regions in which corresponding modes are selected.

Driving torque, fuel economy, and the like, are different from one another among these drive modes, so regions of those drive modes are determined by a vehicle speed, a driving force, and the like, and the drive mode is selected on the basis of a required driving force, represented by an accelerator position, and a vehicle speed. FIG. 2 shows the regions of the drive modes, determined in advance by a vehicle speed V and a driving force F. In FIG. 2, the region indicated by the sign AHV is the HV mode region, the region indicated by the sign A2M is the two-motor mode region, and the region indicated by the sign A1M is the one-motor mode region.

As shown in FIG. 2, because the HV mode is selected when the vehicle speed is relatively high and the required driving force is relatively large, a large load is exerted on the components of the power split mechanism 4 at that time. When the HV mode is selected in this way, the MOP 12 is driven with rotation of the carrier 8. Therefore, in the HV mode, oil is supplied from the MOP 12 to the power split mechanism 4, and lubrication and cooling are performed by the oil.

On the other hand, the one-motor mode is selected when the vehicle speed is relatively low and the required driving force is relatively small. In the one-motor mode, torque is input from the ring gear 6 to the power split mechanism 4; however, torque (reaction torque) against the input torque is not output from the engine 1 or the first motor 2. Therefore, no large load is exerted on the power split mechanism 4, and a large amount of oil is not required for lubrication and cooling. In addition, the power split mechanism 4 is covered with a case (not shown), and oil is flying inside the case in order to cool other gears and heat generating members. Therefore, in the one-motor mode, even when oil is not actively supplied to the power split mechanism 4 with the use of the MOP 12 or the EOP 13, the power split mechanism 4 is lubricated or cooled by oil flying inside the case.

On the other hand, the two-motor mode is selected when the vehicle speed is higher than the vehicle speed in the one-motor mode and lower than the vehicle speed in the HV mode and the required driving force is larger than the required driving force in the one-motor mode and smaller than the required driving force in the HV mode. Because the carrier 8 is fixed by engaging the brake mechanism 10 in order to transmit the output torque of the first motor 2 to the drive wheels 21, a large load is exerted on the power split mechanism 4. However, because the carrier 8 is fixed as described above, the MOP 12 is not driven. Therefore, in the two-motor mode, the power split mechanism 4 is lubricated or cooled by supplying the power split mechanism 4 with oil from the EOP 13.

An electronic control unit (ECU) 23 is provided as a controller. The ECU 23 is used to select any one of these drive modes and control portions of the hybrid drive system and the EOP 13 such that the selected drive mode is achieved. The ECU 23 includes a first control unit 23a, a second control unit 23b, a plurality of detection units 23c, a plurality of estimation units 23d, and the like. The first control unit 23a selects a drive mode. The second control unit 23b controls the driving and stop of the EOP 13. The plurality of detection units 23c detect electrical signals from sensors (not shown). The plurality of estimation units 23d estimate various states on the basis of the input electrical signals, and the like. The ECU 23 is mainly formed of a microcomputer. The ECU 23 is configured to perform a computation on the basis of input data and data, such as a prestored map, and output the computed result as a control command signal to the engine 1, each of the motors 2, 3, the electrical storage device or the inverter for each of the motors 2, 3, the brake mechanism 10, the EOP 13, or the like. Examples of data that are input to the ECU 23, that is, data that are used in control, include the vehicle speed, the accelerator position, the rotation speeds of the motors 2, 3, the driving currents of the motors 2, 3, the temperature (oil temperature) of lubricating oil), the temperature (ambient temperature) of an environment in which the hybrid vehicle is placed, a traveling road surface condition (gradient) that is detected by a navigation system, and the like. The above-described regions shown in FIG. 2, a region AE in which the EOP 13 (described later) is driven (hereinafter, referred to as EOP driving region), a map for determining an adjustment value ΔA (described later), determination thresholds for time and temperature, and the like, are stored in advance.

Figure 1:
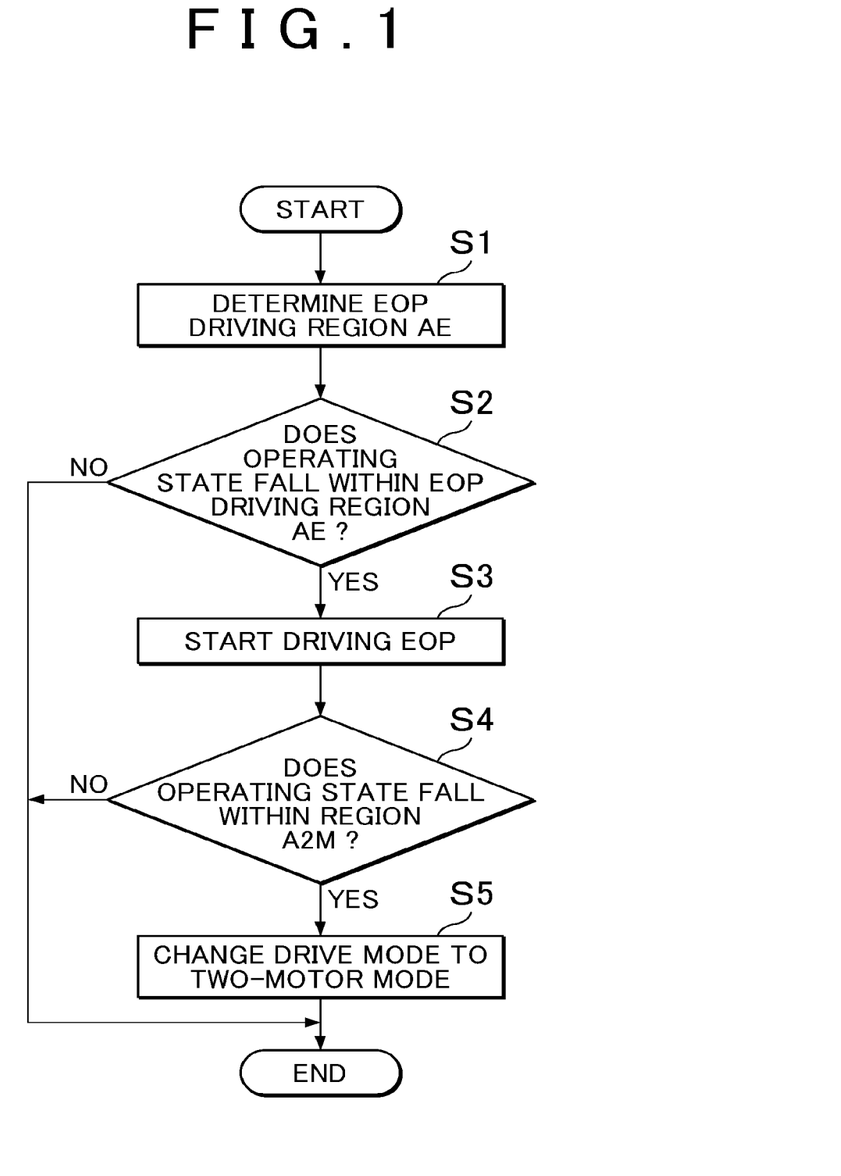
FIG. 1 is a flowchart for illustrating an example of control that is executed by an electronic control unit in a control system according to the invention and a control example for causing an EOP to begin to be driven.

As described above, in the one-motor mode or the HV mode, oil is not supplied from the EOP 13 to the power split mechanism 4, so driving of the EOP 13 is started at the time of changing the drive mode to the two-motor mode. A control system for a hybrid vehicle according to the invention is configured to, when a predetermined condition is satisfied in a state where the one-motor mode or the HV mode is selected, activates the EOP 13 to start supplying oil from the EOP 13 to the power split mechanism 4. That is, before the drive mode is changed to the two-motor mode, the EOP 13 is configured to be activated to start supplying oil to the power split mechanism 4. The predetermined condition is, for example, a condition that the required driving force in the case where the one-motor mode is selected is larger than or equal to a predetermined value smaller than a value at which the drive mode is changed from the one-motor mode to the two-motor mode, a condition that the vehicle speed in the case where the one-motor mode is selected is higher than or equal to a predetermined value lower than a value at which the drive mode is changed from the one-motor mode to the two-motor mode, a condition that the required driving force in the case where the HV mode is selected is smaller than or equal to a predetermined value larger than a value at which the drive mode is changed from the HV mode to the two-motor mode, a condition that the vehicle speed in the case where the HV mode is selected is lower than or equal to a value higher than a vehicle speed at which the drive mode is changed from the HV mode to the two-motor mode, or the like. FIG. 1 shows a flowchart for illustrating an example of control that is executed in the control system according to the invention. The ECU 23 is configured to execute the flowchart as the controller. The example shown in FIG. 1 is repeatedly executed at predetermined time intervals while the EOP 13 is stopped.

In the example shown in FIG. 1, the EOP 13 is configured to be driven in response to the required driving force and the vehicle speed, and, initially, the EOP driving region AE is determined (step S1). In order to suppress insufficient lubrication or insufficient cooling just after changing the drive mode to the two-motor mode as described above, the EOP driving region AE is desirably set to a region wider than a region A2M in which the two-motor mode is selected. An example in which the EOP driving region AE is determined in that way is indicated by the dashed line in FIG. 2. A lower limit value of the EOP driving region AE is determined within a region A1M in which the one-motor mode is selected. An upper limit value of the EOP driving region AE is determined within a region AHV in which the HV mode is set. The lower limit value of the EOP driving region AE is an example of each of a first pump changing value and a second pump changing value when the invention is implemented. The upper limit value of the EOP driving region AE is an example of each of a third pump changing value and a fourth pump changing value when the invention is implemented. A lower limit value of the region A2M in which the two-motor mode is selected is an example of each of a first drive changing value and a second drive changing value when the invention is implemented. An upper limit value of the region A2M is an example of each of a third drive changing value and a fourth drive changing value when the invention is implemented. The EOP driving region AE may be fixed or may be configured such that the upper limit value and lower limit value of the EOP driving region AE are determined as values that are increased or reduced in driving force or vehicle speed in response to various conditions from the region A2M in which the two-motor mode is selected. In the following description, an amount (deviation) by which the driving force or vehicle speed is increased or reduced is referred to as adjustment value ΔA.

The EOP driving region AE is determined such that the EOP 13 is activated before the drive mode changes from the one-motor mode or the HV mode to the two-motor mode and excessive driving of the EOP 13 is suppressed. Therefore, the EOP driving region AE is desirably determined such that a time from when the driving of the EOP 13 is started to when oil begins to be supplied to the power split mechanism 4 rather than a time that is taken for the drive mode to change from the one-motor mode or the HV mode to the two-motor mode is shortened. A time from when the driving of the EOP 13 is started to when oil begins to be supplied to the power split mechanism 4 changes in response to the viscosity of oil, a time during which the EOP 13 is stopped, and the like, so, in the following description, initially, an example of determining the adjustment value ΔA in response to the viscosity of oil will be described.

Figure 3:
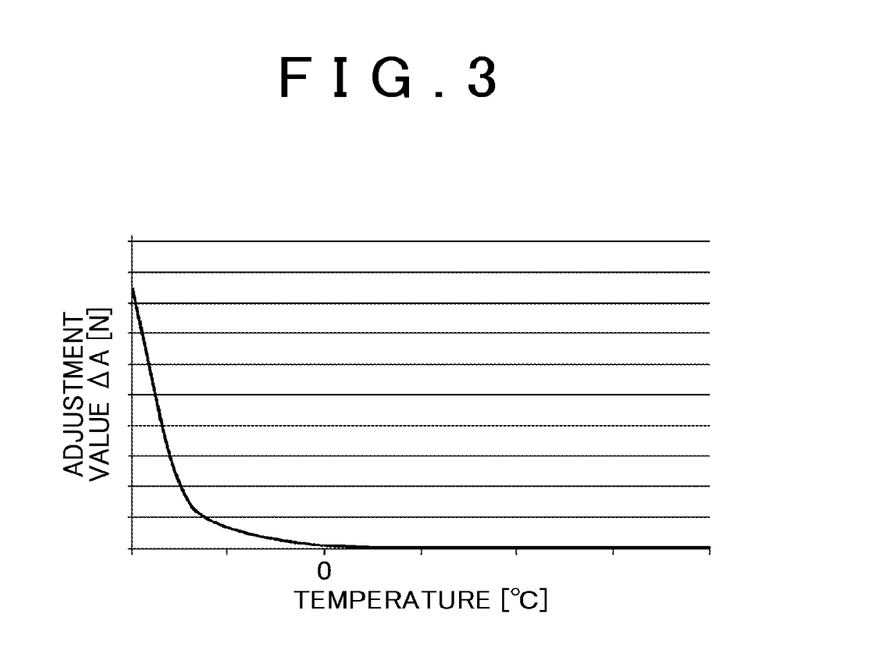
FIG. 3 is a graph that shows an example of a map for determining an adjustment value on the basis of a temperature of oil.

The viscosity of oil increases as the temperature of oil decreases. Because a viscous drag between oil and an oil passage increases as the viscosity of oil increases, a time from when the driving of the EOP 13 is started to when oil reaches the power split mechanism 4 extends. Therefore, in order for oil output from the EOP 13 to be supplied to the power split mechanism 4 at the time when the drive mode is changed to the two-motor mode, the driving of the EOP 13 is desirably started earlier as the temperature of oil decreases. In the example shown in FIG. 3, the EOP driving region AE is determined such that the adjustment value ΔA is increased as the temperature of oil decreases. In FIG. 3, the abscissa axis represents the temperature of oil, and the ordinate axis represents the adjustment value ΔA.

The adjustment value ΔA in FIG. 3 may be determined by obtaining a time that is taken for oil to flow from the EOP 13 to the power split mechanism 4 for each temperature of oil, subsequently obtaining the rate of change in driving force as a result of ordinary operation and then integrating the obtained time with the rate of change. Alternatively, the adjustment value ΔA may be determined by integrating the obtained time with an acceleration based on a current driving force. Alternatively, a driving force or a vehicle speed at which oil is supplied from the EOP 13 to the power split mechanism 4 at the time when the drive mode is changed to the two-motor mode may be obtained through an experiment, simulation, or the like, by using a driving force and the temperature of oil as parameters or using a vehicle speed and the temperature of oil as parameters, and then a difference between the driving force or vehicle speed and the lower limit value or upper limit value of the region A2M in which the two-motor mode is selected may be determined as the adjustment value ΔA. The adjustment value ΔA determined as described above is added to the upper limit value of the region A2M in which the two-motor mode is selected or subtracted from the lower limit value of the region A2M. Thus, the EOP driving region AE is determined.

The temperature of oil may be estimated by detecting the ambient temperature or the temperature of the EOP 13. Therefore, not limited to the configuration that the adjustment value ΔA is determined by using the temperature of oil as a parameter as described above, the adjustment value ΔA may be determined on the basis of another parameter that contributes to the temperature of oil, such as the ambient temperature and the temperature of the EOP 13.

Figure 4:
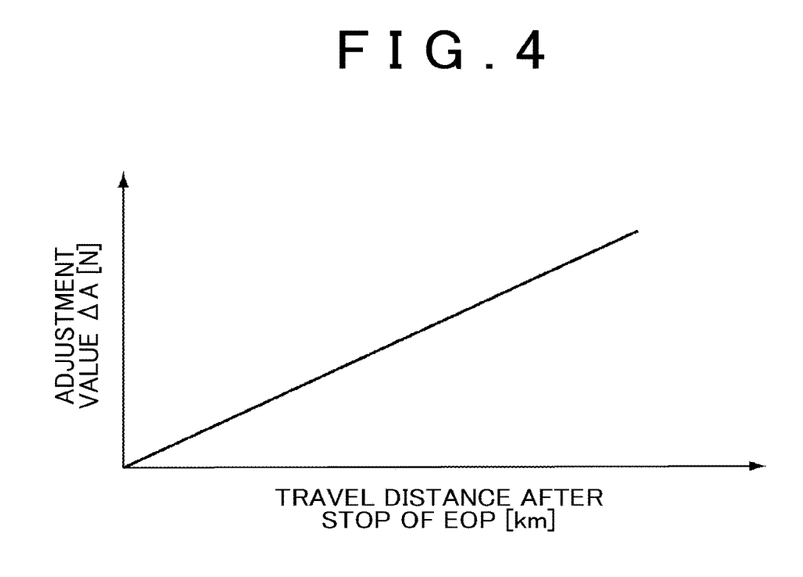
FIG. 4 is a graph that shows an example of a map for determining an adjustment value on the basis of a travel distance from when the EOP is stopped.

In addition, the EOP 13 draws oil and then discharges the oil, and oil inevitably leaks from the EOP 13 or the oil passage, so, when the EOP 13 is stopped, oil is drained from the EOP 13 or the oil passage in response to the stopped time. Therefore, when the EOP 13 is driven again, oil is filled inside the EOP 13 and inside the oil passage and then oil is supplied to the power split mechanism 4, so, as a time during which the EOP 13 is stopped extends, a time from when the driving of the EOP 13 is started again to when oil is supplied to the power split mechanism 4 extends. Therefore, the EOP driving region AE is desirably determined by obtaining the adjustment value ΔA on the basis of an elapsed time from when the EOP 13 is stopped, a travel distance or stopped time from when the EOP 13 is stopped, or the like, and then adding the adjustment value ΔA to the upper limit value of the region A2M in which the two-motor mode is selected or subtracting the adjustment value ΔA from the lower limit value of the region A2M. FIG. 4 shows an example of the above configuration. The abscissa axis represents a travel distance from when the EOP 13 is stopped, and the ordinate axis represents an adjustment value ΔA. The adjustment value ΔA may be increased in proportion to a travel distance as shown in FIG. 4 or may be increased quadratically.

On the other hand, it is not possible to determine a time during which the EOP 13 is stopped on the basis of a period during which the power (Acc) of the vehicle is off. In such a case, for example, the adjustment value ΔA is set to the same value as the adjustment value ΔA that is determined on the basis of a time by which it may be determined that oil has been completely drained from the EOP 13 and the oil passage. Thus, the adjustment value ΔA is desirably determined such that oil reliably reaches the power split mechanism 4 at the time when the drive mode is changed from the one-motor mode to the two-motor mode. After the drive mode has been once changed to the two-motor mode, it is possible to determine, for example, a time during which the EOP 13 is stopped, so, in such a case, the adjustment value ΔA just needs to be determined on the basis of the above-described control, or the like.

In the one-motor mode or the HV mode, the required driving force changes toward the region A2M in which the two-motor mode is selected. As the amount of change in the required driving force increases, there is a higher possibility that the drive mode is changed to the two-motor mode or there is a higher possibility that the drive mode is changed to the two-motor mode in a short time. Specifically, when the traveling road is an uphill, as the gradient of the uphill increases, there is a higher possibility that the required driving force increases. As the required driving force increases in that way, there is a higher possibility that the drive mode is changed from the one-motor mode to the two-motor mode. When the traveling road is a downhill, as the gradient of the downhill increases, the required driving force reduces or there is a higher possibility that regenerative brake is carried out. As the required driving force reduces in that way or regenerative brake is carried out, there is a higher possibility that the drive mode is changed from the HV mode to the two-motor mode. Therefore, as the amount of change in the required driving force increases, the adjustment value ΔA is desirably increased.

Figure 5:
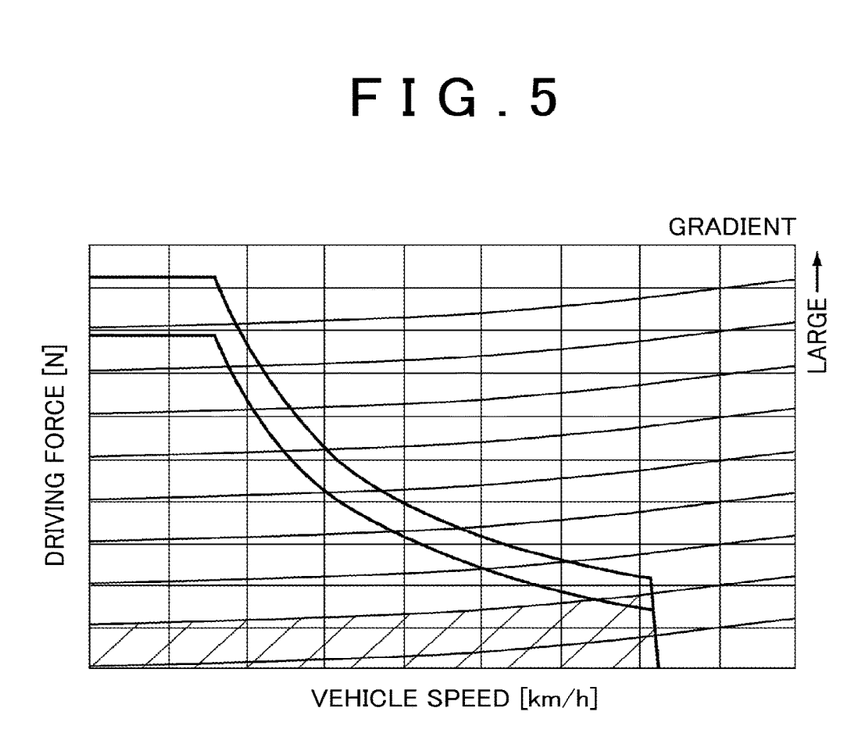
FIG. 5 is a graph that shows an example of a map for determining an adjustment value on the basis of a gradient of a traveling road.
Figure 6:
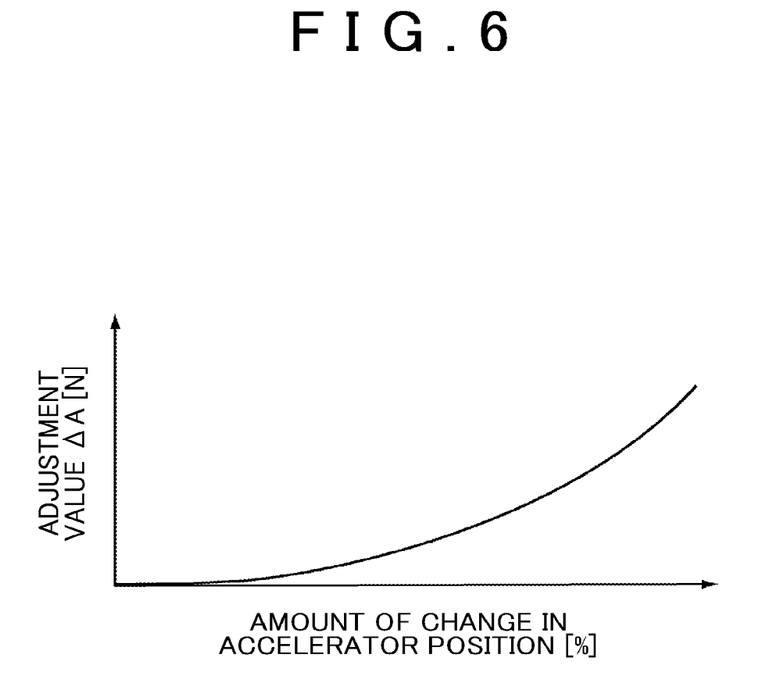
FIG. 6 is a graph that shows an example of a map for determining an adjustment value on the basis of an amount of change in accelerator position.

An example in which the adjustment value ΔA is determined in response to the amount of change in the required driving force in that way is shown in FIG. 5 and FIG. 6. In the example shown in FIG. 5, while the hybrid vehicle is traveling on an uphill in a state where the one-motor mode is selected, the adjustment value ΔA is determined in response to the gradient of the uphill. When the gradient is θ1, a hatched amount is the adjustment value ΔA.

This map is obtained as follows. When the driving force is increased such that the vehicle speed is kept constant while the hybrid vehicle is traveling on an uphill, an amount by which the driving force is increased is obtained by an experiment, simulation, or the like, and the amount of increase in the driving force may be determined as the adjustment value ΔA. The lower limit value of the EOP driving region AE may be determined by subtracting the adjustment value ΔA from the lower limit value of the region A2M in which the two-motor mode is selected. The gradient of a traveling road surface may be detected on the basis of a sensor that is mounted on the vehicle and that detects the gradient, a navigation system, or the like.

Because the required driving force changes in response to the accelerator operation amount, there is a higher possibility that the drive mode is changed to the two-motor mode as the amount of change in accelerator operation amount (position) increases. Therefore, as shown in FIG. 6, the adjustment value ΔA may be determined so as to increase as the amount of change in accelerator operation amount increases, and the EOP driving region AE may be determined by adding the adjustment value ΔA to the upper limit value of the region A2M in which the two-motor mode is selected or subtracting the adjustment value ΔA from the lower limit value of the region A2M. The adjustment value ΔA may be increased quadratically in response to the amount of change in accelerator operation amount as shown in FIG. 6 or may be increased in proportion to the amount of change in accelerator operation amount.

After the EOP driving region AE is determined in response to the various conditions as described above, it is determined whether an operating state based on the required driving force and the vehicle speed falls within the EOP driving region AE (step S2). When negative determination is made in step S2 as a result of the fact that the operating state based on the required driving force and the vehicle speed falls outside the EOP driving region AE, the routine is once ended directly. In contrast, when the operating state falls within the EOP driving region AE, the driving of the EOP 13 is started (step S3). Subsequently, it is determined whether the operating state falls within the region A2M in which the two-motor mode is selected (step S4).

When negative determination is made in step S4 as a result of the fact that the operating state falls outside the region A2M in which the two-motor mode is selected, that is, when the operating state falls within the region A1M in which the one-motor mode is selected or the region AHV in which the HV mode is selected, the routine is once ended directly. In this case, while the EOP 13 remains being driven, the hybrid vehicle travels in the one-motor mode or the HV mode. In contrast, when affirmative determination is made in step S4 as a result of the fact that the operating state falls within the region A2M in which the two-motor mode is selected, the drive mode is changed to the two-motor mode (step S5), and then the routine is once ended.

By determining the EOP driving region AE to a region wider than the region A2M in which the two-motor mode is selected as described above, the EOP 13 is driven before the drive mode is changed to the two-motor mode. Therefore, it is possible to supply oil to the power split mechanism 4 with no delay from a change of the drive mode to the two-motor mode. As a result, it is possible to suppress insufficient lubrication and insufficient cooling in the two-motor mode, so it is possible to extend a period during which the hybrid vehicle travels in the two-motor mode or increase an opportunity to cause the hybrid vehicle to travel in the two-motor mode. Because the EOP 13 is driven on the basis of a time until oil is supplied from the EOP 13 to the power split mechanism 4, the amount of change in the required driving force, or the like, as described above, it is possible to suppress occurrence of, for example, a situation that the EOP 13 is excessively driven and, by extension, it is possible to suppress deterioration of electric power consumption.

Figure 7:
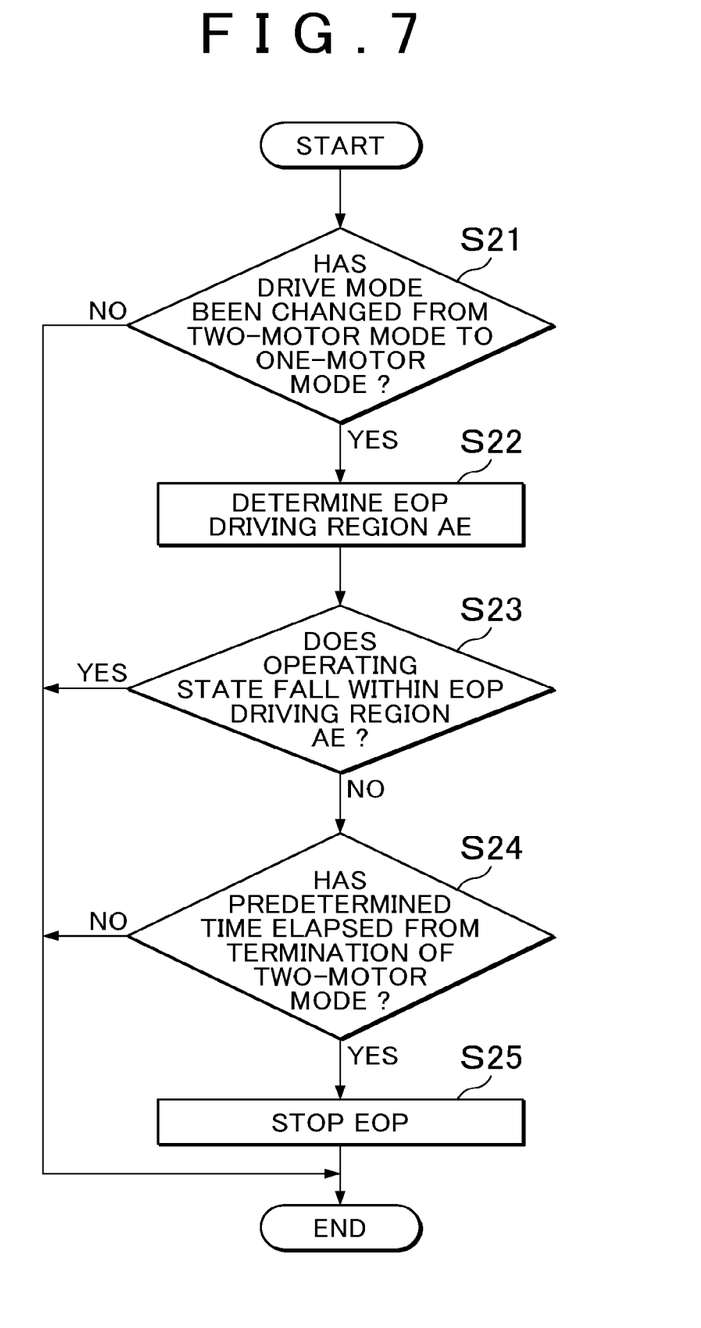
FIG. 7 is a flowchart for illustrating an example of control that is executed by the electronic control unit in the control system according to the invention and a control example for stopping the EOP on the basis of an elapsed time from when a two-motor mode is terminated.

On the other hand, when the EOP 13 is stopped in the case where the one-motor mode is selected, cooling is not carried out by oil that is supplied from the EOP 13, so cooling performance decreases as compared to when the EOP 13 is driven. In contrast, when the EOP 13 continues to be driven even in the one-motor mode, there is a possibility that the electric power consumption for driving the EOP 13 increases. Therefore, the control system according to the invention is configured to, after the drive mode is changed from the two-motor mode to the one-motor mode, continue to cause the EOP 13 to operate to a certain extent in order to cool the power split mechanism 4 and then stop the EOP 13. An example of that control is shown in FIG. 7. The routine shown in FIG. 7 is repeatedly executed at predetermined time intervals while the EOP 13 is being driven.

In the example shown in FIG. 7, initially, it is determined whether the drive mode has been changed from the two-motor mode to the one-motor mode (step S21). This step S21 may be determined on the basis of whether the required driving force and the vehicle speed are smaller than the region A2M in which the two-motor mode is selected or whether a one-motor mode flag is set by other control. When negative determination is made in step S21 as a result of the fact that the two-motor mode is kept, the routine is once ended directly.

In contrast, when affirmative determination is made in step S21 as a result of the fact that the drive mode is changed from the two-motor mode to the one-motor mode, the EOP driving region AE is determined as in the case of step S1 shown in FIG. 1 (step S22). Subsequently, it is determined whether the required driving force and the vehicle speed fall within the EOP driving region AE determined in step S22 (step S23). These step S22 an step S23 are provided in order to suppress a delay of supply of oil from the EOP 13 to the power split mechanism 4 when the drive mode is changed from the one-motor mode to the two-motor mode again.

Therefore, when affirmative determination is made in step S23 as a result of the fact that the required driving force and the vehicle speed fall within the EOP driving region AE, the routine is once ended while the EOP 13 remains being driven. In contrast, when negative determination is made in step S23 as a result of the fact that the required driving force and the vehicle speed fall outside the EOP driving region AE, it is subsequently determined whether an elapsed time from when the two-motor mode is terminated is longer than or equal to a predetermined time (step S24). The predetermined time in step S24 is a time that is taken until the temperature of the power split mechanism 4 decreases to a predetermined temperature, such as a temperature obtained in consideration of durability and a temperature at the time of assembling the power split mechanism 4 to the vehicle, by supplying oil from the EOP 13 to the power split mechanism 4 in a state where the hybrid vehicle travels in the one-motor mode, and may be determined by an experiment, simulation, or the like.

When negative determination is made in step S24 as a result of the fact that the elapsed time from when the two-motor mode is terminated is shorter than the predetermined time, the routine is once ended directly. That is, the EOP 13 continues to be driven. In contrast, when affirmative determination is made in step S24 as a result of the fact that the elapsed time from when the two-motor mode is terminated is longer than or equal to the predetermined time, the power split mechanism 4 is sufficiently cooled. In order to reduce the electric power consumption, the EOP 13 is stopped (step S25), and then the routine is once ended.

Even after the drive mode is changed from the two-motor mode to the one-motor mode as described above, it is possible to cool the power split mechanism 4 by driving the EOP 13 continuously for a predetermined time. Therefore, the power split mechanism 4 is promptly cooled, so, even when the drive mode is changed from the one-motor mode to the two-motor mode in a relatively early stage, it is possible to suppress a situation that a travel period in the two-motor mode is limited or an opportunity for the hybrid vehicle to travel in that way is limited because of limitations due to overheat of the power split mechanism 4, or the like. Because the EOP 13 is not constantly driven, it is possible to suppress an increase in the electric power consumption.

The predetermined time in step S24 shown in FIG. 7 may be a fixed value or a value that changes in response to a condition. Specifically, even when the EOP 13 is driven in the two-motor mode, the temperature of the power split mechanism 4 increases in no small part, and the temperature varies depending on a load in the two-motor mode. That is, the temperature of the power split mechanism 4 at the time when the drive mode is changed from the two-motor mode to the one-motor mode depends on a load in the two-motor mode. This load is based on the output torque and rotation speed of the first motor 2 in the two-motor mode, so the predetermined time may be changed on the basis of the output torque and rotation speed of the first motor 2 at the time when the hybrid vehicle is traveling in a state where the two-motor mode is selected. More specifically, the predetermined time may be extended as the output torque of the first motor 2 in the two-motor mode increases, the predetermined time may be extended as the rotation speed of the first motor 2 increases, or the predetermined time may be extended as the average of the output torque of the first motor 2 or the average of the rotation speed of the first motor 2 in the two-motor mode increases.

Figure 8:
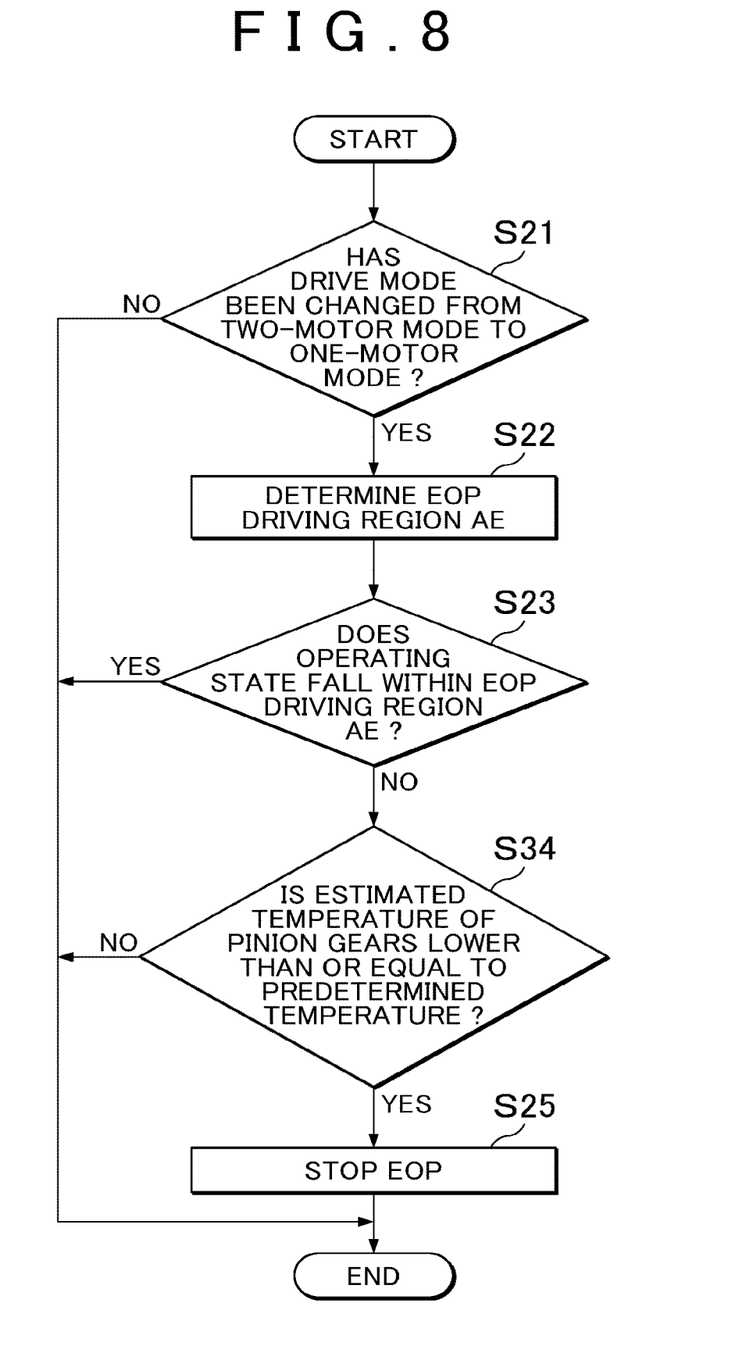
FIG. 8 is a flowchart for illustrating an example of control that is executed by the electronic control unit in the control system according to the invention and a control example for stopping the EOP on the basis of an estimated temperature of pinion gears.

In the above-described example, the EOP 13 continues to be driven in the predetermined period after the two-motor mode is terminated. Instead, the temperature of the power split mechanism 4 may be detected or estimated, and the EOP 13 may be stopped on the condition that the temperature becomes lower than or equal to a predetermined temperature. The flowchart for illustrating the example is shown in FIG. 8. The example shown in FIG. 8 is the same as the example shown in FIG. 7 except step S34 in FIG. 8, so like reference numerals denote the same steps, and the description thereof is omitted.

In the example shown in FIG. 8, the temperature of the pinion gears 7 is estimated, and the EOP 13 is stopped when the estimated temperature becomes lower than or equal to the predetermined temperature. Specifically, when negative determination is made in step S23 as a result of the fact that the required driving force and the vehicle speed fall outside the EOP driving region AE, it is determined whether the estimated temperature of the pinion gears 7 is lower than or equal to the predetermined temperature (step S34). When affirmative determination is made in step S34 as a result of the fact that the estimated temperature of the pinion gears 7 is lower than or equal to the predetermined temperature, the EOP 13 is stopped (step S25). In contrast, when negative determination is made in step S34 as a result of the fact that the estimated temperature of the pinion gears 7 is higher than the predetermined temperature, the EOP 13 continues to be driven, and then the routine is once ended.

The reason why the temperature of the pinion gears 7 is estimated in step S34 is that the rotation speed of the pinion gears 7 becomes the highest rotation speed while the hybrid vehicle is traveling in the two-motor mode and there is a high possibility that a heat generation amount increases. The temperature of the pinion gears 7 in step S34 is allowed to be obtained from a difference between the heat generation amount of the pinion gears 7 at the time when the hybrid vehicle is traveling in the two-motor mode and a heat radiation amount after the drive mode is changed to the one-motor mode. The heat generation amount may be obtained on the basis of the output torque and rotation speed of the first motor 2 by an experiment, simulation, or the like. The heat radiation amount may be obtained on the basis of the vehicle speed in the one-motor mode and the amount of oil that is supplied from the EOP 13 by an experiment, simulation, or the like. The predetermined temperature in step S34 is a predetermined temperature that is determined in advance by design, such as a temperature obtained in consideration of the temperature of the power split mechanism 4 and a temperature at the time of assembling the power split mechanism 4 to the vehicle.

In this way, even after the two-motor mode is terminated, it is possible to cool the power split mechanism 4 by continuing to drive the EOP 13 until the temperature of the pinion gears 7 decreases to the predetermined temperature. Therefore, the power split mechanism 4 is promptly cooled, so, even when the drive mode is changed from the one-motor mode to the two-motor mode in a relatively early stage, it is possible to suppress a situation that a travel period in the two-motor mode is limited or an opportunity for the hybrid vehicle to travel in that way is limited because of limitations due to overheat of the power split mechanism 4, or the like. Because the EOP 13 is not constantly driven, it is possible to suppress an increase in the electric power consumption.

In process of changing the drive mode from the two-motor mode to the one-motor mode, the output torque and rotation speed of the first motor 2 are gradually reduced. When the output torque and rotation speed of the first motor 2 are gradually reduced in that way, a heat radiation amount becomes larger than a heat generation amount in a predetermined operating state. At the time when the heat radiation amount becomes larger than the heat generation amount in that way, the EOP 13 may be stopped. Specifically, the EOP 13 may be stopped as follows. The heat generation amount of the power split mechanism 4 is obtained on the basis of the output torque and rotation speed of the first motor 2 by an experiment or simulation, and the heat radiation amount is obtained in a state where the EOP 13 is stopped by an experiment or simulation at the same time. Subsequently, an operating state at which the heat radiation amount becomes larger than the heat generation amount is obtained, and then the EOP 13 is stopped at the time at which the operating state is achieved. In this way, by stopping the EOP 13 in response to the operating state of the first motor 2 at which the heat radiation amount becomes larger than the heat generation amount in transition of a change from the two-motor mode to the one-motor mode, it is possible to stop the EOP 13 while continuing heat radiation action. Therefore, it is possible to suppress excessive operation of the EOP 13 or it is possible to early stop the EOP 13. As a result, because it is possible to shorten a time during which the EOP 13 is driven, it is possible to reduce the electric power consumption.

In the above-described specific example, the power split mechanism is formed of a single-pinion-type planetary gear mechanism. Instead, in the invention, the power split mechanism may be formed of a double-pinion-type planetary gear mechanism. Because the MOP 12 is driven in the HV mode, there is a high possibility that a sufficient amount of oil is supplied to the power split mechanism 4 and a large amount of oil is filled in the oil passage at the time when the drive mode is changed from the HV mode to the two-motor mode, the upper limit value of the EOP driving region AE may be the same as the upper limit value of the region in which the two-motor mode is selected. That is, any one of the upper limit value and lower limit value of the EOP driving region AE may be determined as a range wider than the upper limit value or lower limit value of the region A2M in which the two-motor mode is selected.

What is claimed is:

1. A control system for a hybrid vehicle, the vehicle including an engine, an output member, a power split mechanism, a brake mechanism, a first motor, a second motor, a first oil pump, and a second oil pump, the power split mechanism including a first rotating element, a second rotating element, and a third rotating element, the power split mechanism being configured to carry out differential action, an output torque of the engine being transmitted to the first rotating element, the first motor having a power generation function being coupled to the second rotating element, the output member being coupled to the third rotating element, the brake mechanism being configured to selectively stop rotation of the first rotating element, the second motor being configured to add a driving torque for propelling the vehicle to a torque of the output member, the first oil pump being coupled to the first rotating element, the first oil pump being configured to be driven by the output torque of the engine to supply oil to the power split mechanism, and the second oil pump being configured to be driven through energization to supply oil to the power split mechanism, the control system comprising:
an electronic control unit configured to:
select a second drive mode when any one of i) and ii) is satisfied,
  i) a required driving force is larger than the required driving force at which a first drive mode is selected or a vehicle speed is larger than the vehicle speed at which the first drive mode is selected, and
  ii) the required driving force is lower than the required driving force at which a third drive mode is selected or the vehicle speed is lower than the vehicle speed at which the third drive mode is selected;
activate the second oil pump to start supplying oil from the second oil pump to the power split mechanism when any one of iii) to vi) is satisfied,
  iii) the required driving force becomes larger than or equal to a first force value while the first drive mode is active, the first force value being smaller than a second force value at which a drive mode is changed from the first drive mode to the second drive mode,
  iv) the vehicle speed becomes higher than or equal to a first speed value while the first drive mode is active, the first speed value being lower than a second speed value at which the drive mode is changed from the first drive mode to the second drive mode, v) the required driving force becomes smaller than or equal to a third force value while the third drive mode is active, the third force value being larger than a fourth force value at which the drive mode is changed from the third drive mode to the second drive mode, and vi) the vehicle speed becomes lower than or equal to a third speed value while the third drive mode is active, the third speed value being higher than a fourth speed value at which the drive mode is changed from the third drive mode to the second drive mode, wherein the first drive mode is a mode in which fixing of the first rotating element by the brake mechanism is released and the vehicle travels by using the driving torque of the second motor, the second drive mode is a mode in which a torque output from the first motor is transmitted to the output member via the power split mechanism in a state where the first rotating element is fixed by the brake mechanism and the vehicle travels by using the driving torque output from the second motor, and the third drive mode is a mode in which the vehicle travels by using the output torque of the engine or the output torque of both the engine and the second motor in a state where fixing of the first rotating element by the brake mechanism is released.

2. The control system according to claim 1, wherein the electronic control unit is configured to:

set a first deviation or a second deviation such that a time from when the second oil pump is activated to when oil begins to be supplied to the power split mechanism is shorter than a first time or a second time respectively, the first deviation being a deviation between the second force value and the first force value, the second deviation being a deviation between the second speed value and the first speed value, the first time being a time that is required for the required driving force to change from the first force value to the second force value in the first drive mode, and the second time being a time that is required for the vehicle speed to change from the first speed value to the second speed value, and set a third deviation or a fourth deviation such that the time from when the second oil pump is activated to when oil begins to be supplied to the power split mechanism is shorter than a third time or a fourth time respectively, the third deviation being a deviation between the fourth force value and the third force value, the fourth deviation being a deviation between the fourth speed value and the third speed value, the third time being a time that is required for the required driving force to change from the third force value to the fourth force value in the third drive mode, and the fourth time being a time that is required for the vehicle speed to change from the third speed value to the fourth speed value.

3. The control system according to claim 2, wherein the electronic control unit is configured to:

detect any one of a temperature of the oil, an ambient temperature, and a temperature of the second oil pump, and set at least any one of the first deviation, second deviation, third deviation, and fourth deviation such that the at least any one of the first deviation, second deviation, third deviation, and fourth deviation increases as the detected temperature decreases.

4. The control system according to claim 2, wherein the electronic control unit is configured to:

detect an elapsed time or travel distance from when the second oil pump is stopped, and set at least any one of the first deviation, second deviation, third deviation, and fourth deviation such that the at least any one of the first deviation, second deviation, third deviation, and fourth deviation increases as the detected elapsed time or travel distance extends.

5. The control system according to claim 2, wherein the electronic control unit is configured to:

detect a vehicle stop time, and set at least any one of the first deviation, second deviation, third deviation, and fourth deviation such that the at least any one of the first deviation, second deviation, third deviation, and fourth deviation increases as the detected vehicle stop time gets longer.

6. The control system according to claim 2, wherein the electronic control unit is configured to:

estimate an amount of change in the required driving force toward the second force value in a state where the first drive mode is selected or an amount of change in the required driving force toward the fourth force value in a state where the third drive mode is selected, and set at least any one of the first deviation, second deviation, third deviation, and fourth deviation such that the at least any one of the first deviation, second deviation, third deviation, and fourth deviation increases as the estimated amount of change in the required driving force increases.

7. The control system according to claim 2, wherein the electronic control unit is configured to:

detect a gradient of a traveling road surface, and set at least any one of the first deviation, second deviation, third deviation, and fourth deviation such that the at least any one of the first deviation, second deviation, third deviation, and fourth deviation increases as the detected gradient of the traveling road surface increases.

8. The control system according to claim 1, wherein the electronic control unit is configured to:

detect a rate of change in accelerator position, and set at least any one of the first deviation, second deviation, third deviation, and fourth deviation such that the at least any one of the first deviation, second deviation, third deviation, and fourth deviation increases as the detected rate of change in accelerator position increases.

9. The control system according to claim 1, wherein the electronic control unit is configured to set at least any one of the first force value, the first speed value, the third force value and the third speed value at a time of a startup of the vehicle.

10. The control system according to claim 1, wherein the electronic control unit is configured to continue driving the second oil pump until a predetermined period elapsed from when the drive mode is changed from the second drive mode to the first drive mode.

11. The control system according to claim 10, wherein the electronic control unit is configured to extend the predetermined period as an output torque of the first motor and a rotation speed of the first motor increase at a time when the vehicle is traveling in the second drive mode.

12. The control system according to claim 1, wherein the electronic control unit is configured to:

estimate a temperature of the power split mechanism, and cause the second oil pump to be driven until the estimated temperature becomes lower than or equal to a predetermined temperature.

13. The control system according to claim 1, wherein the electronic control unit is configured to continue driving the second oil pump until an output torque of the first motor and a rotation speed of the first motor become smaller than or equal to corresponding predetermined values in transition of a change from the second drive mode to the first drive mode.

* * * * *